United States Patent [19]

Sato

[11] Patent Number: 5,387,000
[45] Date of Patent: Feb. 7, 1995

[54] HYDRAULIC DRIVE SYSTEM FOR BICYCLES AND THE LIKE

[76] Inventor: Yasunori Sato, 2-1-607, Ohkura 1-Chome, Setagaya-Ku, Tokyo, Japan

[21] Appl. No.: 93,739

[22] Filed: Jul. 20, 1993

[30] Foreign Application Priority Data

Jul. 22, 1992 [JP] Japan .................. 4-195378

[51] Int. Cl.6 .......................................... B62M 19/00
[52] U.S. Cl. .................................. 280/216; 417/273
[58] Field of Search ............... 280/216, 259, 215, 201, 280/214, 260, 210, 212; 180/305, 307; 417/273; 91/491

[56] References Cited

U.S. PATENT DOCUMENTS

| | | | |
|---|---|---|---|
| 3,850,448 | 11/1974 | Stewart | 280/216 |
| 4,313,714 | 2/1982 | Kubeczka | 417/273 |
| 4,546,990 | 10/1985 | Harriger | 280/216 |
| 4,684,143 | 8/1987 | Sato | 280/216 |
| 4,688,815 | 8/1987 | Smith | 280/216 |
| 4,975,025 | 12/1990 | Yamamura et al. | 417/273 |
| 5,281,104 | 1/1994 | Bublitz | 417/273 |

FOREIGN PATENT DOCUMENTS

| | | | |
|---|---|---|---|
| 2405859 | 6/1979 | France | 280/216 |
| 2-43678 | 10/1990 | Japan | |
| 2-43679 | 10/1990 | Japan | |
| 2-43680 | 10/1990 | Japan | |
| 3-7554 | 2/1991 | Japan | |
| 9117913 | 11/1991 | WIPO | 280/216 |

*Primary Examiner*—Kenneth R. Rice
*Assistant Examiner*—F. Zeender
*Attorney, Agent, or Firm*—Parkhurst, Wendel & Rossi

[57] ABSTRACT

A hydraulic drive system for bicycles and the like comprises a casing adapted for enclosing a hanger portion of the bicycle, planetary gear type speed up gears including a carrier integral with a crankshaft for increasing the number of rotations of the crankshaft, an eccentric cam assembly including an outer eccentric cam and an inner eccentric driven by a sun gear of the speed up gears and a variable displacement hydraulic pump having plungers driven by the cam assembly and provided at an input portion of the driving system, the speed up gears, the eccentric cam assembly and the variable displacement hydraulic pump being housed in the casing.

6 Claims, 16 Drawing Sheets

FIG_5
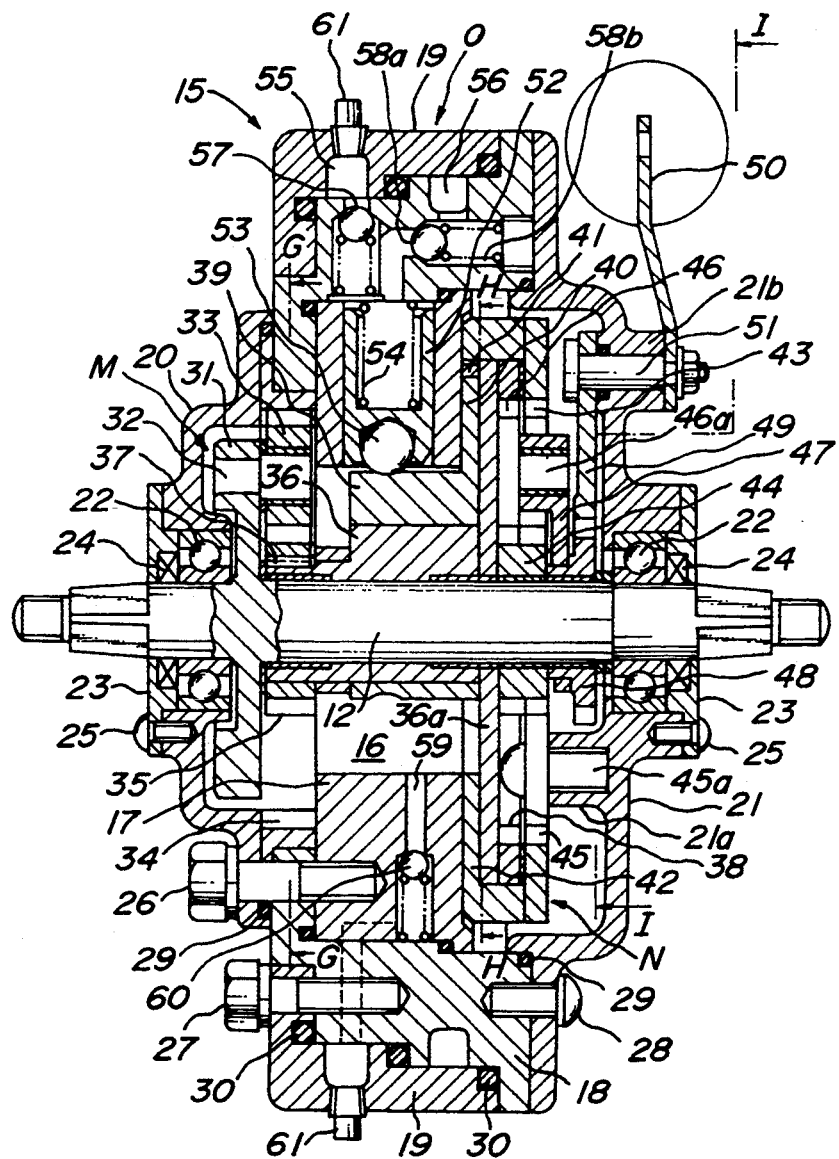

FIG_6
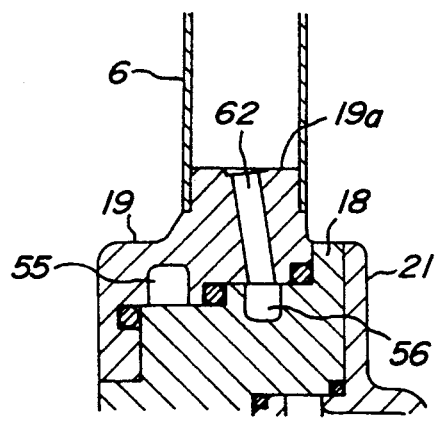
FIG_7
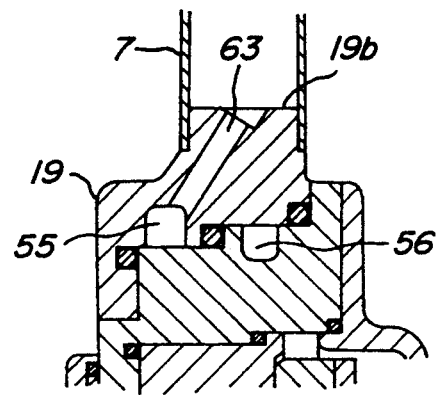

FIG_8
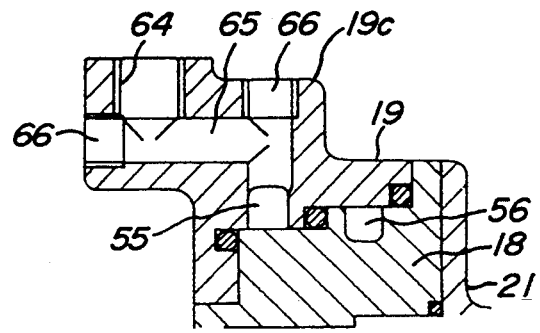
FIG_9
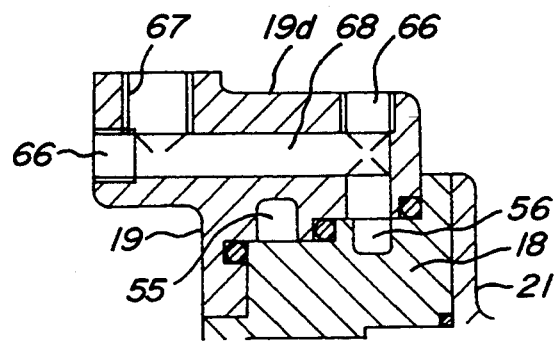
FIG_10
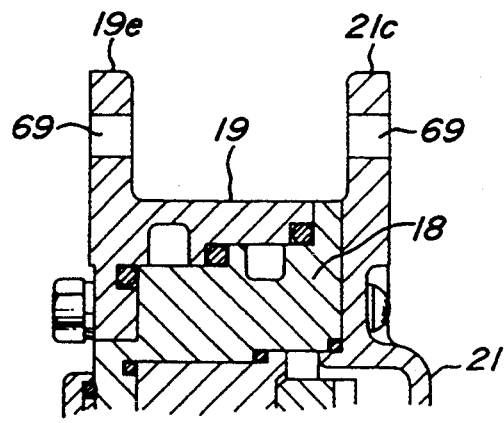

FIG_12

FIG_14
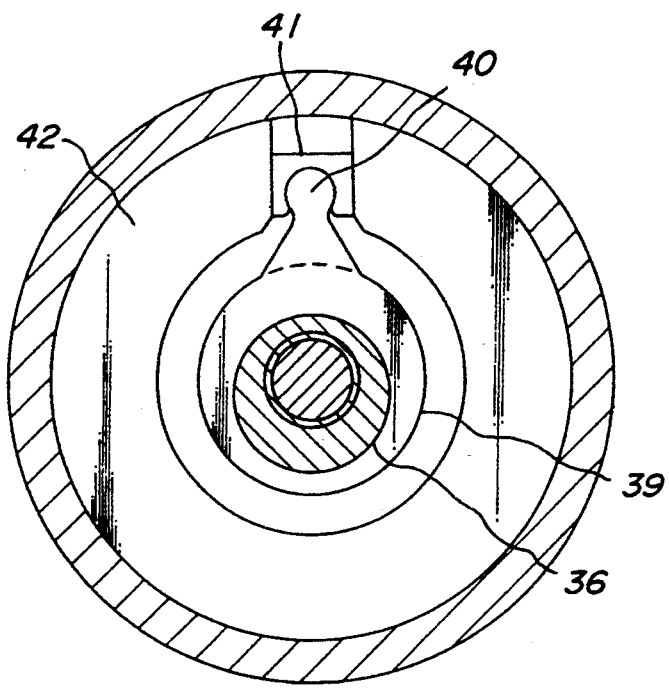

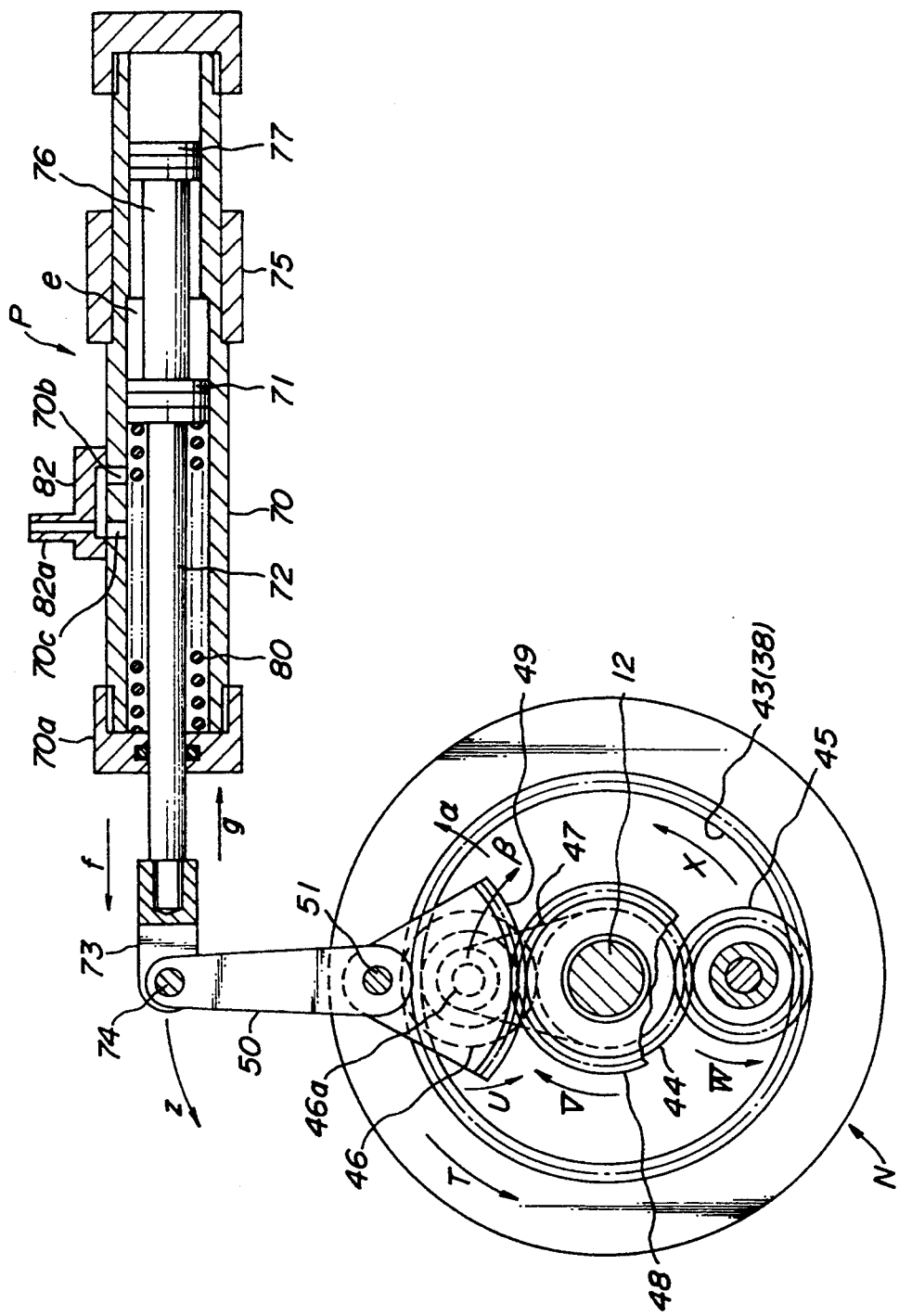

FIG_16
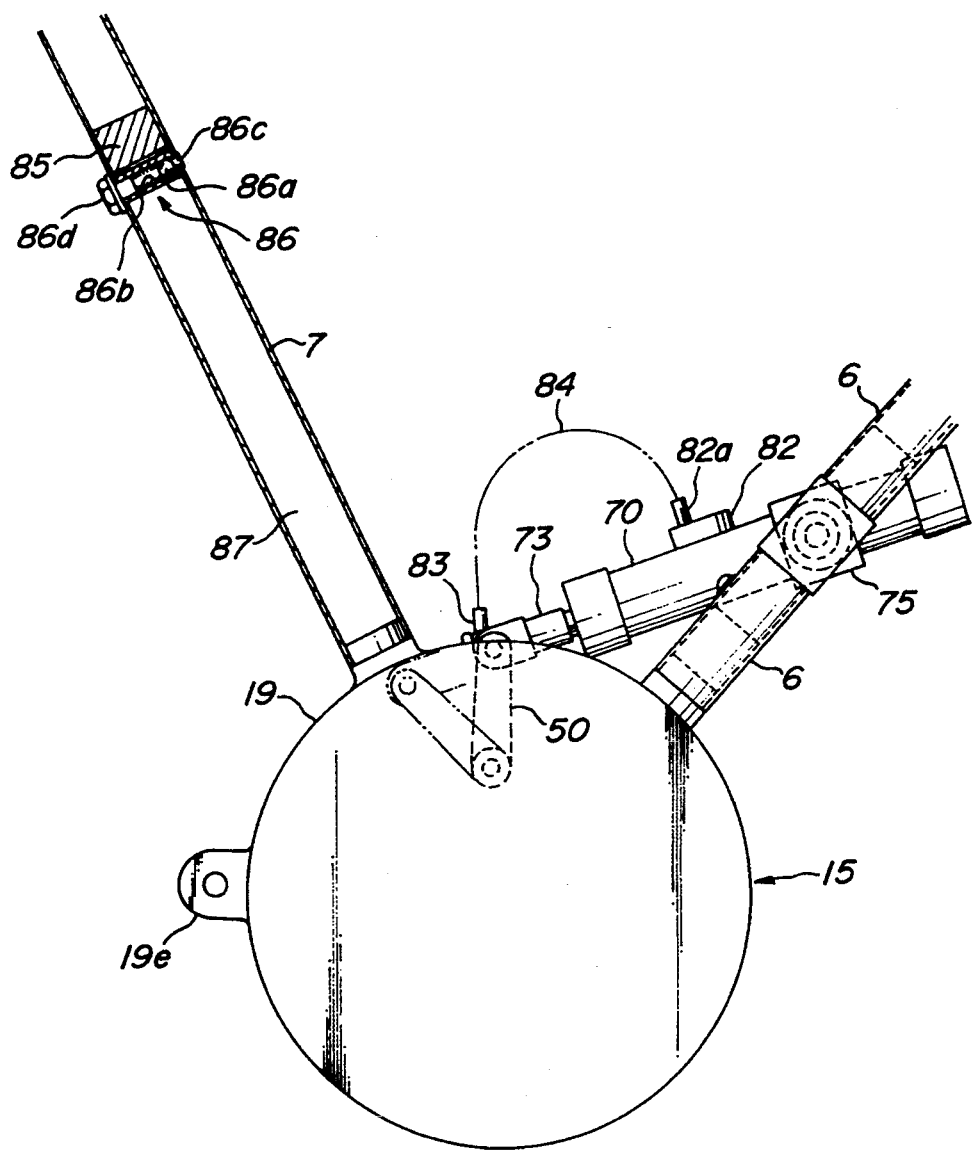

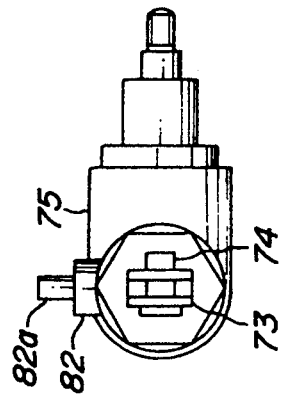
FIG._17c
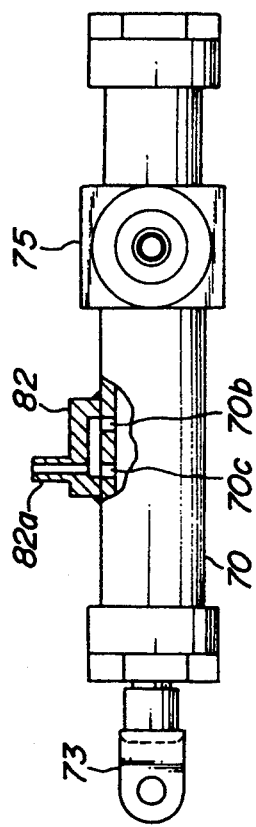
FIG._17a
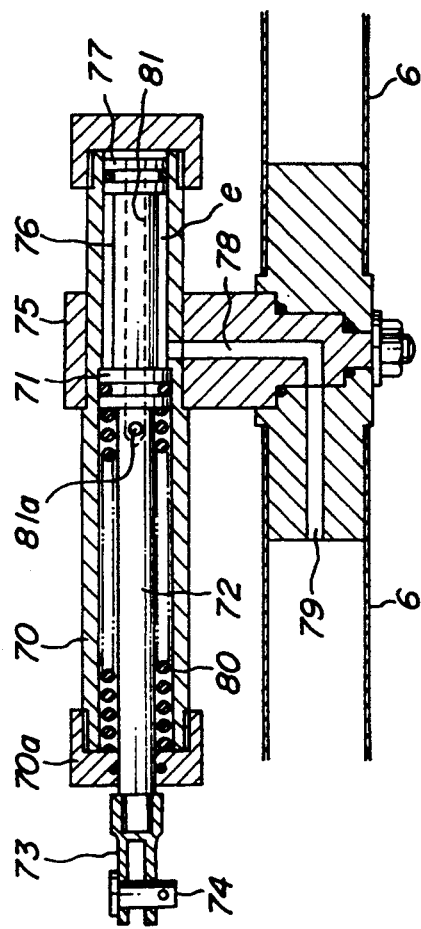
FIG._17b

FIG_18a
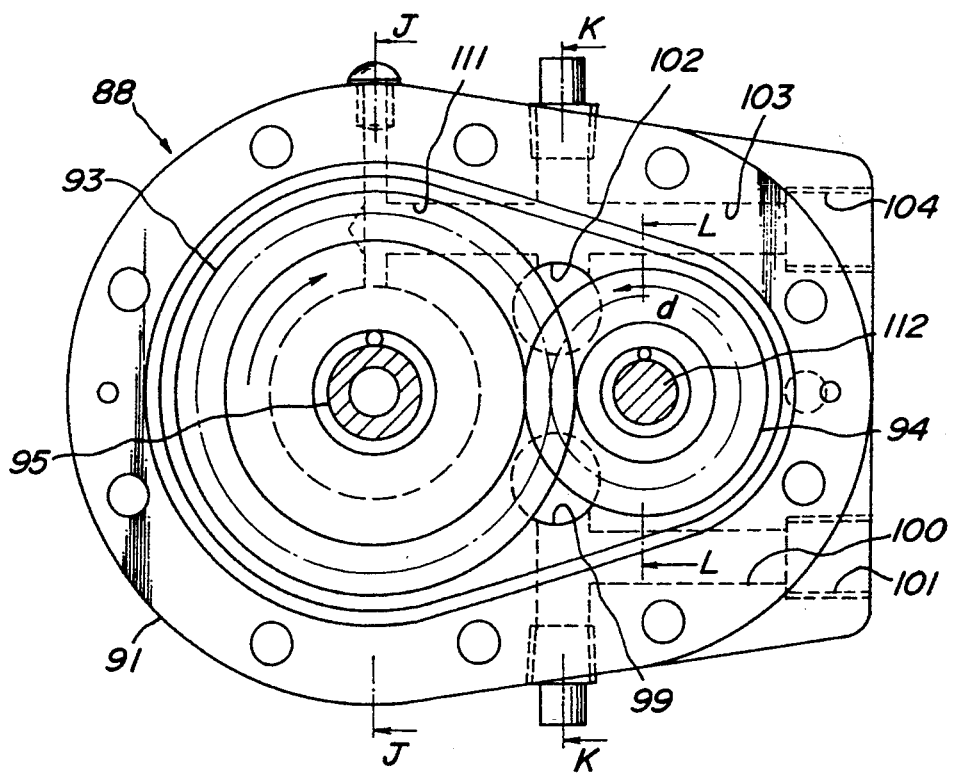
FIG_18b
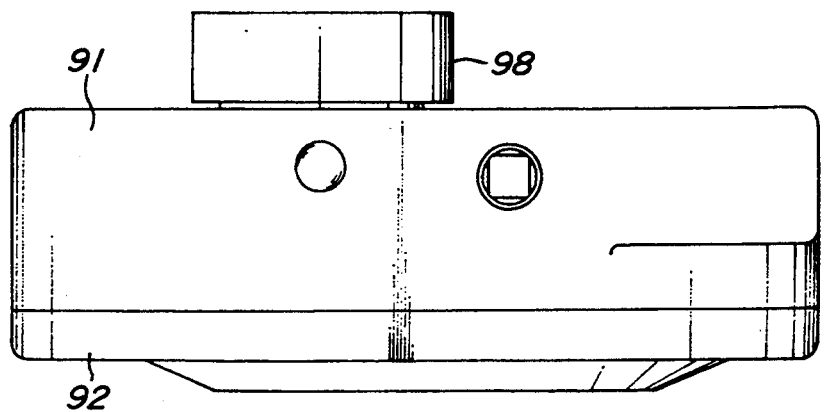

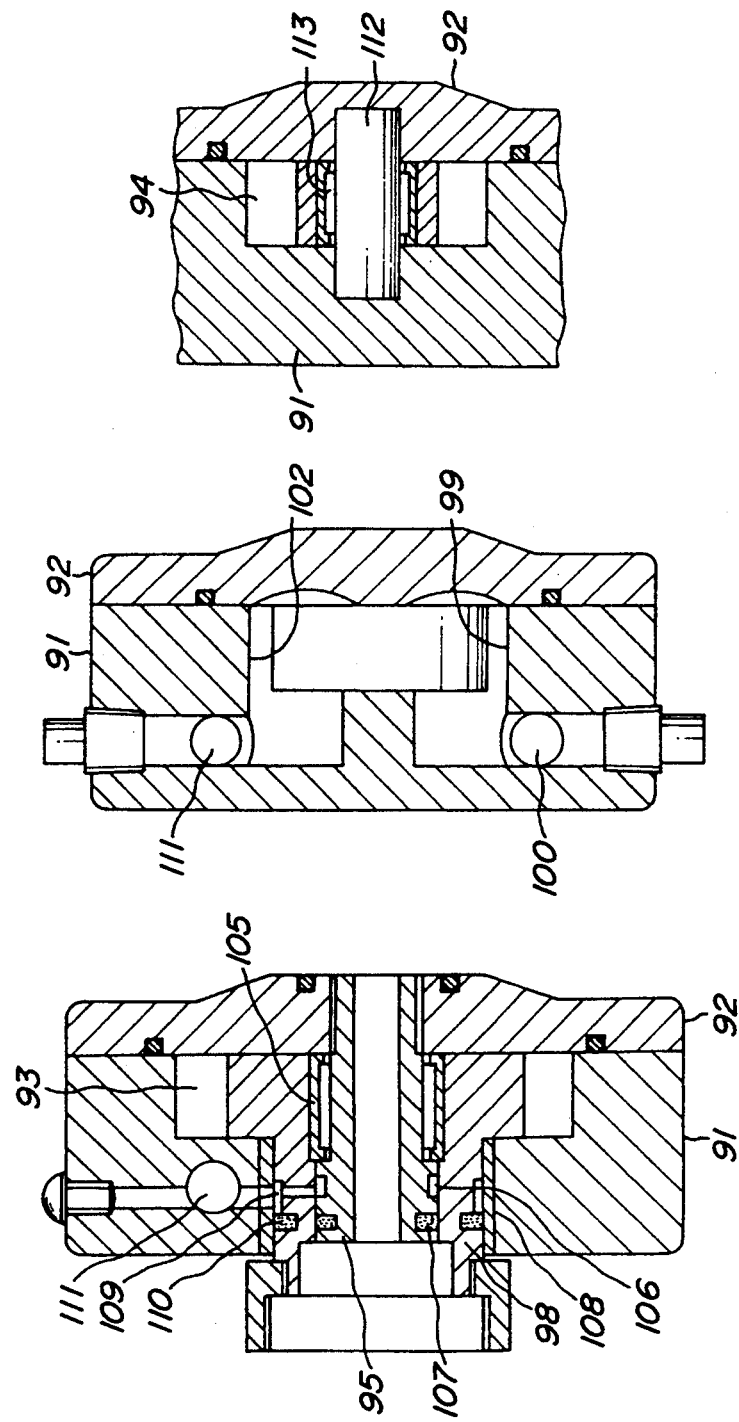

HYDRAULIC DRIVE SYSTEM FOR BICYCLES AND THE LIKE

BACKGROUND OF THE INVENTION

The present invention relates to a hydraulic drive system for bicycles and the like.

The applicant has proposed a bicycle with a hydraulic transmission disclosed in JP-A2-2043677, a variable displacement hydraulic pump for bicycles disclosed in JP-A2-2043678, an apparatus for controlling eccentricity of an eccentric cam assembly disclosed in JPA2-2043679, a fixed displacement hydraulic motor for driving a bicycle disclosed in JP-A2-2043680, and a bicycle having two drive wheels disclosed in JP-A2-307554.

The bicycle disclosed in JP-A2-2043677 corresponding to U.S. Pat. No. 4,684,143 granted to Yasunori Sato, Aug. 4, 1987 is typical of the above prior art. This bicycle comprises a hydraulic drive system including a variable displacement hydraulic pump driven by a crankshaft through a cam assembly and a fixed displacement hydraulic motor for driving a rear driving wheel provided at input and output portions of the hydraulic drive system, respectively, for driving the bicycle.

The variable displacement hydraulic pump included in a hydraulic drive system comprises a cam assembly consisting of an inner eccentric cam fixed to a crankshaft, and an outer eccentric cam rotatably and eccentrically fitted on the inner eccentric cam. The inner eccentric cam is formed integrally with an inner internal gear having the same center axis as that of the crankshaft. An outer internal gear having the same number of teeth and the same pitch diameter as those of the inner internal gear is arranged to be rotated together with the outer eccentric cam. The outer internal gear is concentrically rotatable relative to the inner internal gear. A center gear is rotatably supported on the center shaft and a fear is rotatably supported on a stationary shaft so that the gear is in mesh with the center gear and one of the inner and outer internal gears. A rocking gear is rotatably supported by a free end of a rocking arm which is rotatably fitted on the center shaft so that the rocking gear is in mesh with the center gear and other of the inner and outer internal gears. Thus, the eccentricity of the eccentric cam assembly can be controlled in a stepless manner by rotating the rocking arm.

In the prior art mentioned above, the variable displacement hydraulic pump combined with the eccentric cam assembly adapted for controlling the eccentricity in a stepless manner is driven by means of a crank mechanism of the bicycle to supply hydraulic oil from the variable displacement hydraulic pump to the fixed displacement hydraulic motor provided at a drive wheel of the bicycle to thereby drive the bicycle.

However, the number of rotations of the pump attained by a person's foot power through the crank mechanism of the bicycle is naturally limited and a capacity of the pump provided at the crank portion of the bicycle is also practically limited. Accordingly, when the drive wheel of bicycle is rotated by the fixed displacement hydraulic motor supplied by the variable displacement hydraulic pump having a limited output, an operating hydraulic pressure to be used becomes high, in particular the hydraulic pressure rises to several hundred kgf/cm$^2$ at maximum output when the bicycle is driven in an uphill.

The operating hydraulic pressure is desirably as low as possible since a transmitting efficiency of such a hydraulic pump and hydraulic motor intends to decrease as the operating hydraulic presser becomes high. The present invention aims to attain the aforementioned desire.

Furthermore, the prior art mentioned above has a problem that since the variable displacement hydraulic pump is separately constructed from a hanger portion or a bottom bracket of the bicycle and is excessively extended from one side of the bicycle so that the bicycle is unbalanced with respect to the opposite side, and the crank pedals are interfered with during their operation.

Furthermore, in the prior art mentioned above, a hydraulic cylinder including a balancing spring is used as an automatic speed regulator or changer for automatically changing the speed, but the maximum hydraulic pressure for use in such a regulator becomes higher than 1,000 kgf/cm$^2$ even if the hydraulic pressure is restrained to be as low as possible and therefore a spring having a large size must be used for balancing with the thrust force so that it is difficult to design the regulator in miniature size.

SUMMARY OF THE INVENTION

It is a principal object of the invention to provide a hydraulic drive system for bicycles which eliminates all the aforementioned disadvantages in the prior art.

A hydraulic drive system for bicycles according to the present invention, comprises a casing adapted for enclosing a hanger portion of the bicycle, planetary gear type speed up gears for increasing number of rotations of a crankshaft, an eccentric cam assembly driven by said speed up gears and adapted for controlling its eccentricity during the rotation driven by the speed up gears, and a variable displacement hydraulic pump having plungers driven by the cam assembly and provided at an input portion of the driving system, and said speed up gears, said eccentric cam assembly and said variable displacement hydraulic pump are housed in said casing.

In a preferred embodiment of the invention, the casing may have peripheral protrusions adapted for fitting frame tubes, respectively, and the frame tubes are connected to the casing through the protrusion.

The frame tubes connected to the casing may be formed with hydraulic oil passages therein to communicate with hydraulic oil passages in the casing, and an automatic speed changing hydraulic cylinder is connected to the frame tubes to communicate an oil chamber in the hydraulic cylinder with the hydraulic oil passages in the frame tubes.

In a further preferred embodiment of the invention, a space in said frame tube connected to the casing is communicated with a suction side hydraulic oil passage in the casing and an upper portion of the space in the frame tube is provided with an air vent to provide an oil reservoir in the frame tube.

In another embodiment of the invention, the automatic speed changing hydraulic cylinder may include a cylinder whose head is pivotally connected to a frame, a large piston having a larger diameter, a small piston having a smaller diameter, a piston rod connecting the pistons to define a hydraulic oil chamber therebetween which is communicated with a delivery side hydraulic oil passage in the casing, and a spring for returning the pistons moved by differential pressure applied to the pistons.

BRIEF DESCRIPTION OF THE DRAWINGS

Further objects and advantages of the invention will become apparent as the following description of an illustrative embodiment proceeds with reference to the drawings in which:

FIG. 5 is a sectional view taken along the line A—A in FIG. 4;

FIG. 6 is a fragmentary sectional view taken along the line B—B in FIG. 4;

FIG. 7 is a fragmentary sectional view taken along the line C—C in FIG. 4;

FIG. 8 is a fragmentary sectional view taken along the line D—D in FIG. 4;

FIG. 9 is a fragmentary sectional view taken along the line E—E in FIG. 4;

FIG. 10 is a fragmentary sectional view taken along the line F—F in FIG. 4;

FIGS. 13 and 14 are sectional views similar to FIG. 12 for illustrating operation of the eccentric cam assembly;

FIG. 15 is a sectional view taken along line I—I in FIG. 5;

FIG. 16 is a schematic view illustrating a speed changing hydraulic cylinder connected to a casing;

FIGS. 17a, 17b and 17c illustrate an automatic speed changing device;

FIGS. 18a, and 18b illustrate a hydraulic motor; and

FIGS. 19a, 19b and 19c illustrate fragmentary sections of the hydraulic motor shown in FIGS. 18a, and 18b

DESCRIPTION OF THE PREFERRED EMBODIMENTS

Figure 1:
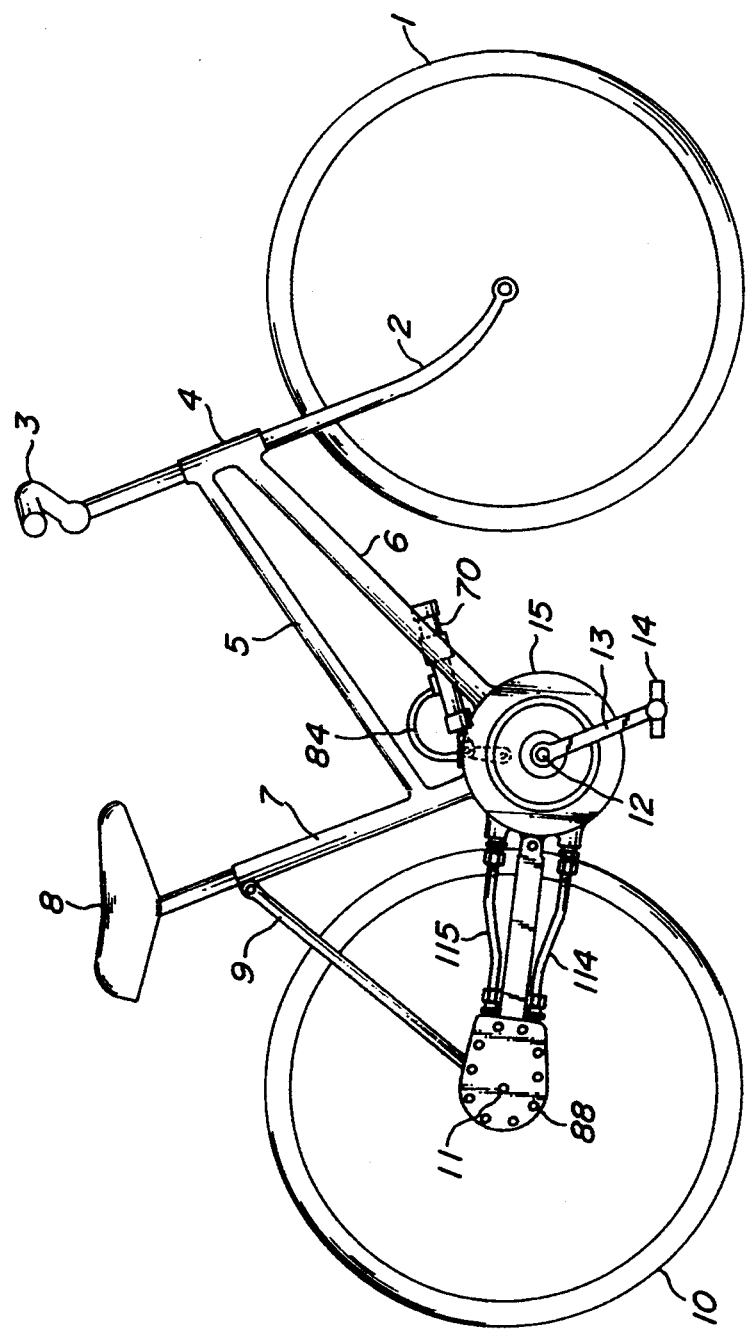
FIG. 1 is a side elevational view of a bicycle equipped with a drive system according to the present invention.

FIG. 1 illustrates a bicycle equipped with a hydraulic drive system according to the invention which comprises a front wheel 1, front fork blades 2, handle bars 3, a head tube 4, a upper down tube 5, a lower down tube 6, a seat tube 7, a saddle 8, back fork blades 9, a rear driving wheel 10, a rear wheel spindle 11, a crankshaft 12, crack arms 13, and crank pedals 14.

Figure 4:
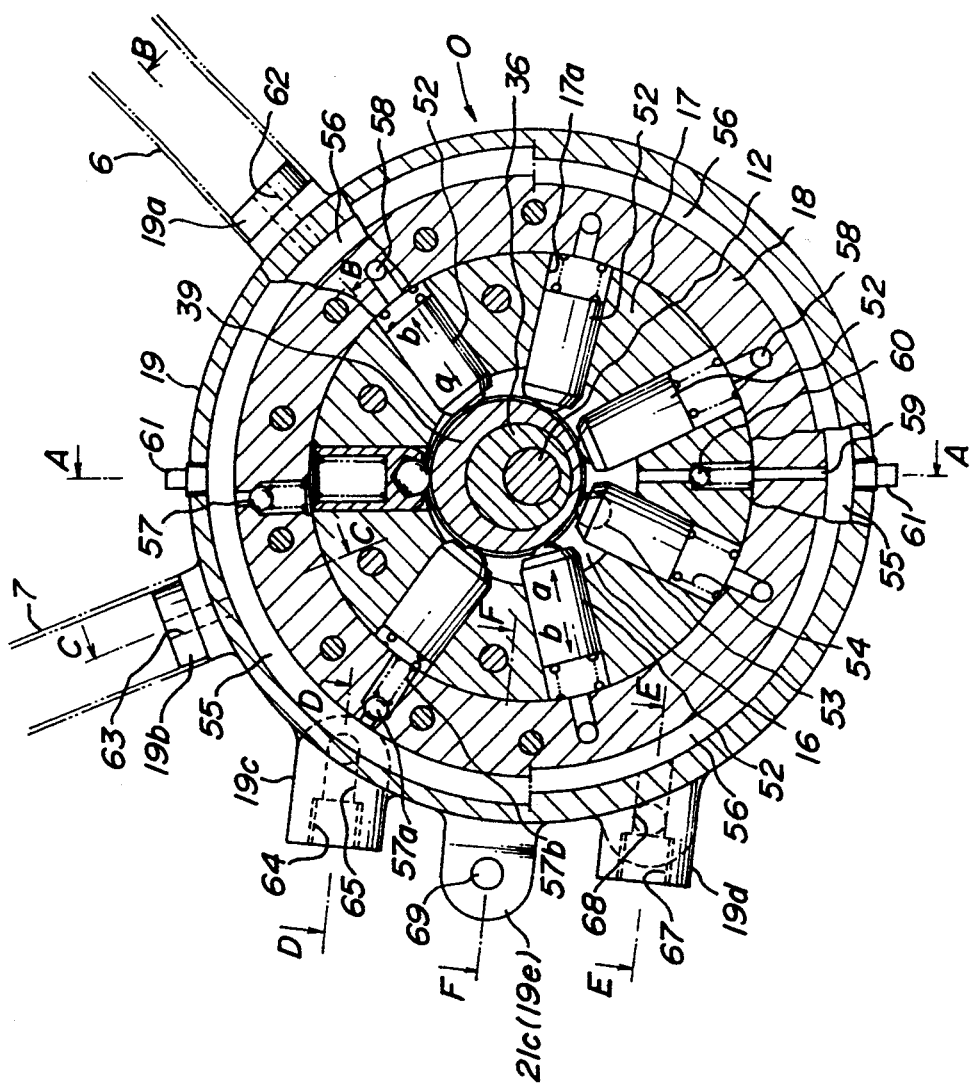
FIG. 4 is a sectional view of the drive system arranged in a hanger portion of a bicycle.

Referring to FIGS. 4 and 5, a generally disc shaped casing 15 is arranged so as to enclose a hanger portion of the bicycle and centered to the crankshaft 12. The casing 15 is composed of an inner case 17 having a central cam chamber 16, a middle case 18 formed in a ring shape having a shoulder portion adapted for fitting on the peripheral portion of the inner case, a ring shaped outer case 19 formed to be fitted on the periphery of the middle case 18 and side cases 20 and 21 encasing the opposite side portions of an assembly of the cases 17, 18 and 19.

Each of the side cases 20 and 21 is provided with a bearing 22 for rotatably supporting the crankshaft 12. The bearings 22 are closed by bearing caps 23 and sealed by oil seal elements 24 fitted inside of the bearing caps which are secured to the respective side cases 20 and 21 by means of screws 25. The side case 20 and the middle case 18 are secured to the inner case 17 by means of bolts 26, the outer case 19 is secured to the middle case 18 by means of bolts 27, and the side case 21 is secured to the middle case 18 by means of screws 28. These jointed portions between the cases are fluid-tightly sealed by means of "O" rings 29 and 30.

Figure 11:
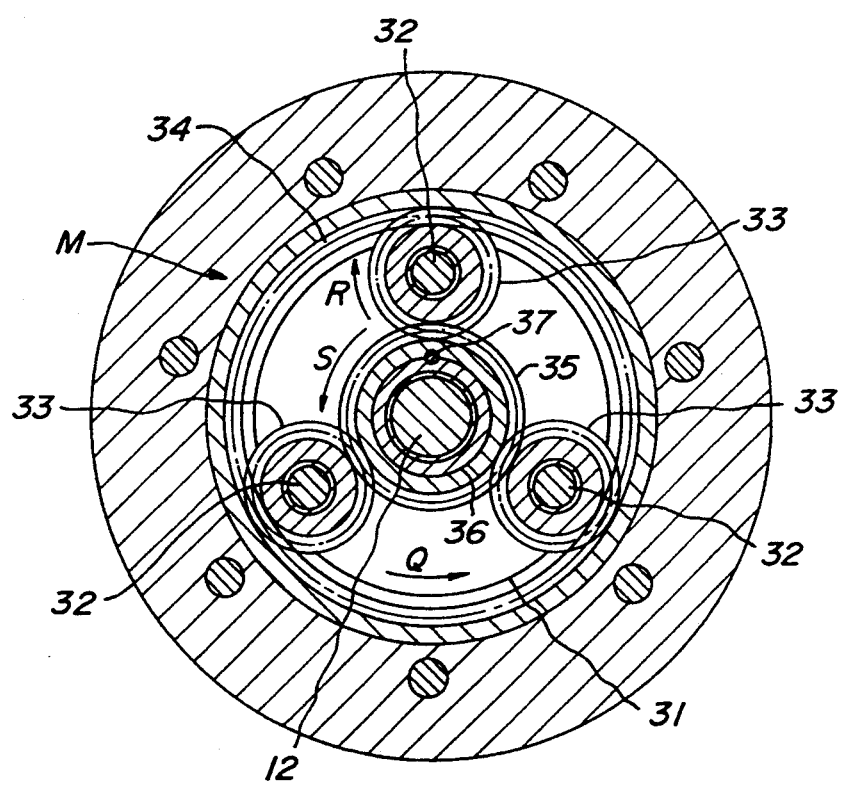
FIG. 11 is a fragmentary sectional view taken along the line G—G in FIG. 5.

Referring to FIGS. 5 and 11, the crankshaft 12 has a disc shaped carrier 31 formed integrally thereto. The carrier 31 is provided with three shafts 32 which are spaced at the same interval in the circumferential direction and rotatably carry planet gears 33, respectively. These planet gears 33 are in mesh with an outer internal gear 34 which is fixed between the side case 20 and the middle case 18 and a sun gear 35 which is rotatably supported on the crankshaft 12 to form a planetary gear type speed up gear M.

An inner eccentric cam 36 is fixed to the sun gear 35 by means of a key 37 and rotatably fitted on the crankshaft 12. The inner eccentric cam 36 is integrally formed with an inner internal gear 38 through a disc portion 36a which is disposed outside of the inner case 17. An outer eccentric cam 39 is rotatably fitted on the inner eccentric cam 36 and has an extension 40 (FIGS. 12-14) extending between the outer surface of the 40 is engaged with a slider 41 which is slidably fitted inner case 17 and the disc portion 36a. The extension 40 is engaged with a slider 41 which is slidably fitted in a groove 42a formed in a disc portion 42 of an outer internal gear 43. The outer internal gear 43 has the same number of teeth and the same pitch diameter as those of the inner internal gear 38 and is coaxially and parallelly arranged to and rotatably fitted on the inner internal gear 38.

Referring to FIGS. 5 and 15, a central gear 44 is rotatably fitted on the crankshaft 12 and a stationary gear 45 is disposed to be in mesh with the central gear 44 and the internal gears 43. The stationary gear 45 has a gear shaft 45a integrally formed thereto which is rotatably supported by a hub portion 21a protruded from the inner wall of the side case 21. A rocking gear 46 is in mesh with the central gear 44 and the internal gears 38, and its gear shaft 46a is rotatably supported by a free end of an arm 47 which is rotatably fitted on the crankshaft at its base portion. The base portion of the arm 47 has a gear wheel 48 which is in mesh with a sector gear 49. The sector gear 49 is integrally connected to an actuator lever 50 and rotatably supported by a shaft 51 on a hub portion 21b of the side case 21 to form an eccentricity control device N for controlling eccentricity of the eccentric cam assembly.

Referring to FIGS. 4 and 5, in the inner case 17, a plurality of, for example seven sets of plunger type suction and delivery devices are arranged radially with respect to the center axis of the crankshaft 12. Each of the suction and delivery devices comprises a cylinder bore 17a a plunger 52, a cam flower or steel ball 53 rotatably supported on the inner end of the plunger 52 and a coil spring 54 for inwardly urging the plunger 52. An annular suction side hydraulic oil passage 55 is formed in the inner wall of the outer case 19 and an annular delivery side hydraulic oil passage 56 is formed in the middle case 28. These oil passages 55 and 56 are communicated with the cylinder bores 17a through check valves 57 and 58, respectively. The suction check valve 57 and the discharge check valve 58 are composed of balls 57a and 58a and coil springs 57b and 58b, respectively. An oil passage 59 shown in FIGS. 4 and 5 includes check valve 60 urged to a closed position by means of a coil spring so as to return leaked oil to the suction side oil passage 55. The suction side oil passage 55 also includes air vents which are closed by means of plugs 61, respectively. Thus, the plunger type suction and delivery device mentioned above constitutes a variable displacement fluid pump O.

Referring to FIGS. 4 and 6, the outer case 19 is provided at its periphery with a protrusion 19a for fitting the lower down tube 6. The protrusion 19a has an oil passage 62 extended therethrough and is fitted to the lower end of the lower down tube 6 in fluid tight manner to communicate an inner space of the lower down tube 6 with the delivery side oil passage 56.

Referring to FIGS. 4 and 7, the outer case 19 is also provide at its periphery with a protrusion 19b for fitting the seat tube 7. The protrusion 19b has an oil passage 63 extended therethrough and is fitted to the lower end of the seat tube 7 in fluid tight manner to communicate an inner space of the seat tube 7 with the suction side oil passage 55.

Referring to FIGS. 4 and 8, the outer case 19 is also provided at its periphery with a protrusion 19c. The protrusion 19c has a tapped hole for connecting a fluid supply conduit to the suction side hydraulic oil passage 55 through an oil passage 65 and additional tapped holes which are used for drilling the oil passage 65 and closed by plugs 66, respectively.

Referring to FIGS. 4 and 9, the outer case 19 is also provided at its periphery with a protrusion 19d. The protrusion 19d has a tapped hole 67 for connecting a fluid discharge conduit to the delivery side hydraulic oil passage 56 through an oil passage 68 and additional tapped holes which are used for drilling the oil passage 68 and closed by plugs 66, respectively.

Referring to FIGS. 4 and 10, the outer case 19 and the side case 21 are provided at their rear portions with lugs 19e and 21c having through holes for bolt-connecting stay arms to the outer and side cases, respectively.

Referring to FIGS. 15, 16, 17a, 17b and 17c an automatic speed changer P includes a hydraulic cylinder 70, a piston 71 movably disposed in the hydraulic cylinder, and a piston rod 72 connected to the piston. The outer end of the piston rod 72 is connected to the upper end of the eccentric operating lever 50 through a connector 73 and a connecting pin 74. The cylinder 70 is supported by a rocking member 75 pivoted to the lower down tube 6 of the bicycle frame.

The automatic speed changer P has a second piston rod 76 which is rearwardly extended from the piston 71 and to which is fixed a second piston 77 having a diameter smaller than that of the first piston 71, and is arranged such that hydraulic oil is supplied to a chamber "e" between the first and second pistons 71 and 77 through oil passages 78 and 79 from an oil chamber in the lower down tube 6. A balancing spring 80 is interposed between the piston 71 and a head portion 70a of the cylinder 70 and an oil return passage 81 is extended through the second piston rod 76 and the first piston 71 from the rear end surface of the second piston 77 to an opening 81a in the first piston rod 72.

The cylinder 70 has ports 70b and 70c which are enclosed by a cover 82 having a hose connection 82a which is connected to a hose connection 83 on the outer case 19 by a flexible hose 84 to communicate the chamber between the first piston 71 and the head portion 70a in the cylinder 70 with the suction oil passage 55.

The seat tube 7 connected to the casing 15 as shown in FIG. 16 is closed at its upper portion with a plug 85 to define a closed space and is provided under the plug with a check valve 86 which is transversely extended through the seat tube and composed of a steel ball 86a and a coil spring 86 fixed by a set screw 86d to permit air to introduce into the closed space from the environment through an opening 86c of the check valve 86, but prevent oil in the closed space from leaking to the environment so that the closed space in the seat tube 7 can be utilized as an oil reservoir 87.

Referring again to FIGS. 1 and 2, a fixed displacement fluid motor is fitted on the rear wheel driving spindle 11 of the rear driving wheel 10 and is fixed to the bicycle body by a pair of a back fork blades 9 and a pair of stays 89 and 90. The fluid motor used in this embodiment is a gear type fixed displacement hydraulic motor including a pair of gears, but any type of fluid motor may be used.

FIGS. 18a, 18b, 19a, 19b and 19c illustrate an example of the gear type fixed displacement hydraulic motor in detail which comprises a gear case body 91, a case cover 92, a large gear 93, and a small gear 94 in mesh with the large gear 93. At the central portion of the large gear 93, there is a shaft sleeve 95 which is screwed in the case cover 92. The sleeve 95 is fitted on a hub 96 of the driving wheel and is fixed by means of a nut 97 fastened on the hub. The large gear 93 has an output shaft 98 which is joined to the hub 96 through a one-way clutch (not shown). The gear case body 92 has a recess 99 formed at a pressure side and communicated with an oil passage 100 which is terminated at a tapped hole 101 for connecting a supply conduit, and a recess 102 formed at a discharge side and communicated with a return oil passage 111 and a return oil passage 103 which is terminated at a tapped hole 104 for connecting a return conduit.

As shown in FIG. 19a, the large gear 93 is rotatably supported by the shaft sleeve 95 through a needle roller bearing 105 and the shaft sleeve 95 has peripheral annular grooves for an oil sump 106 and a seal ring 107. The output shaft 98 is rotatably supported by the bearing metal 108 in the gear casing 91 and has peripheral annular grooves for an oil sump 109 and a seal ring 110. As shown in FIG. 19c, the small gear 94 is rotatably supported by a shaft 112 through a needle roller bearing 113.

Figure 2:
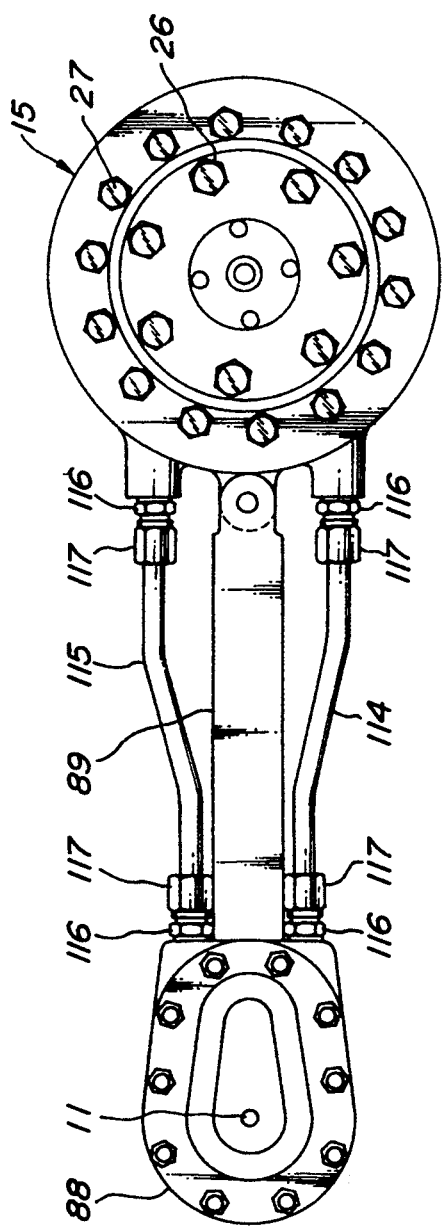
FIG. 2 is a side view of the drive system according to the present invention.
Figure 3:
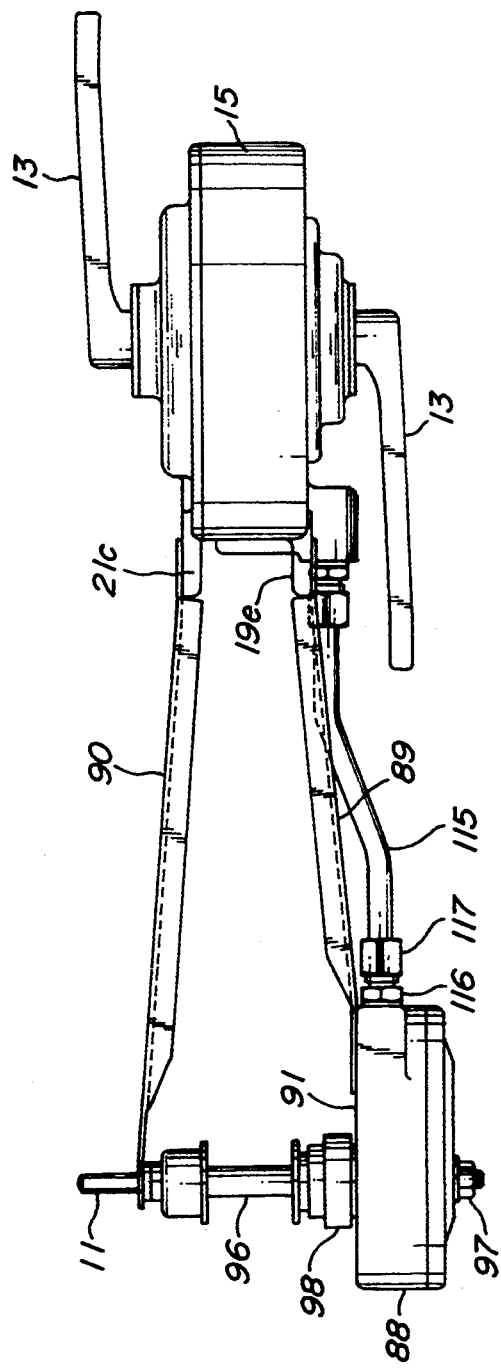
FIG. 3 is a plan view of the drive system shown in FIG. 2.

As mentioned above, the casing 15 on the crank shaft 12 and the fixed displacement hydraulic motor 88 on the rear wheel spindle 11 are connected by the stay 89 between the lug 19e on the casing 15 and the gear case body 91 of the fluid motor 88 and by the stay 90 between the lug 21c on the casing 15 and the rear wheel spindle 11 as shown in FIGS. 1-3.

The delivery side hydraulic oil passage 56 in the outer case 19 and the pressure side hydraulic oil passage 100 in the gear case body 91 of the fluid motor 88 are connected by a conduit 114 connected between the tapped holes 67 and 101, and the suction side hydraulic oil passage 55 in the outer case 19 of the casing 15 and the return side oil passage 103 in the gear case body 91 of the fluid motor 88 are connected by a conduit 115 connected between the tapped holes 64 and 104. The conduits 114 and 115 have connector bodies 116, respectively, joined at their opposite ends and fastened by means of union nuts 117.

The operation of the aforementioned embodiment will be explained hereinafter. When the pedals of the bicycle shown in FIG. 1 are pressed to rotate the crankshaft 12, the carrier 31 formed integrally with the crankshaft 12 is also rotated in a direction shown by an arrow Q in FIG. 11. As the carrier 31 is rotated, three planet gears 33 rotatably carried on their respective shafts 32 on the carrier 31 are rotated about the crankshaft 12 in the direction shown by the arrow Q. The internal gear 34 in mesh with the planet gears 33 is stationary, therefore each of the planet gears 33 is rotated on its shaft 32 as shown by an arrow R during the rotation shown by the arrow Q about the crankshaft. Thus the sun gear 35 in mesh with the planet gear 33 is rotated in a direction shown by an arrow S in an increased speed.

In an example where the internal gear 34 has 44 teeth, the planet gear 33 has 12 teeth and the sun gear 35 has 19 teeth, the sun gear 35 is rotated with an increased speed of 3.316 times the number of rotations of the crankshaft.

When the sun gear 35 is rotated in an increased speed, the inner eccentric cam 36 joined to the sun gear 35 by means of key 37 is also rotated with the increased speed together with the sun gear 35 substantially in unison.

As the rotation of the inner eccentric cam 36 causes the inner internal gear 38 formed integrally with the inner eccentric cam to rotate in a direction shown by an arrow T in FIG. 15, the rocking gear 46 in mesh with the inner internal gear 38 is rotated in a direction shown by an arrow U so long as the arm 47 is stationary. As the rotation of the rocking gear 46 causes the center gear 44 engaging the gear 46 to rotate in a direction shown by an arrow V, so that the fixed gear 45 in mesh with the center gear 44 is rotated in a direction shown by an arrow W. As the result, the outer internal gear 43 in mesh with the fixed gear 45 is rotated in a direction shown by an arrow X. In this case, the rotations of the gears 46 and 45 are quite the same, so that the inner and outer internal gears 38 and 43 are rotated in unison.

Figure 12:
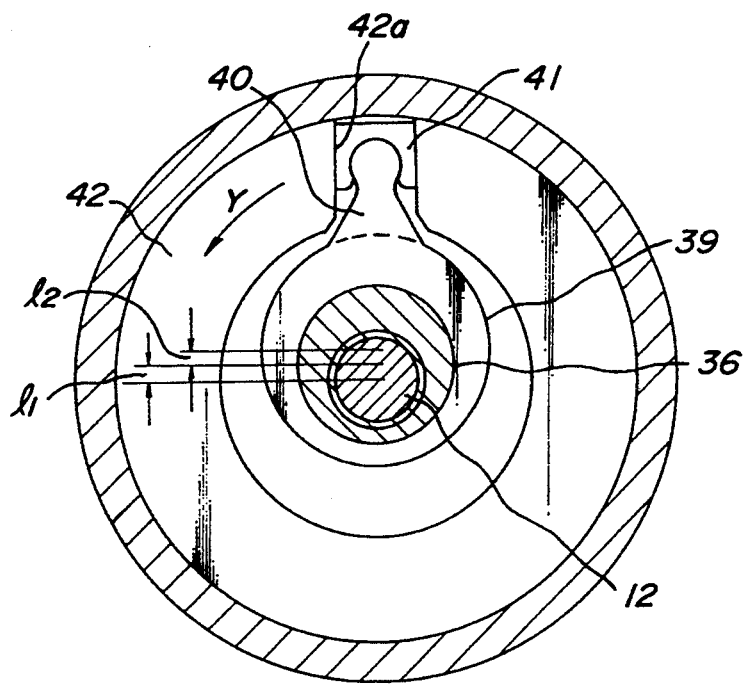
FIG. 12 is a fragmentary sectional view taken along the line H—H in FIG. 5.
Figure 13:
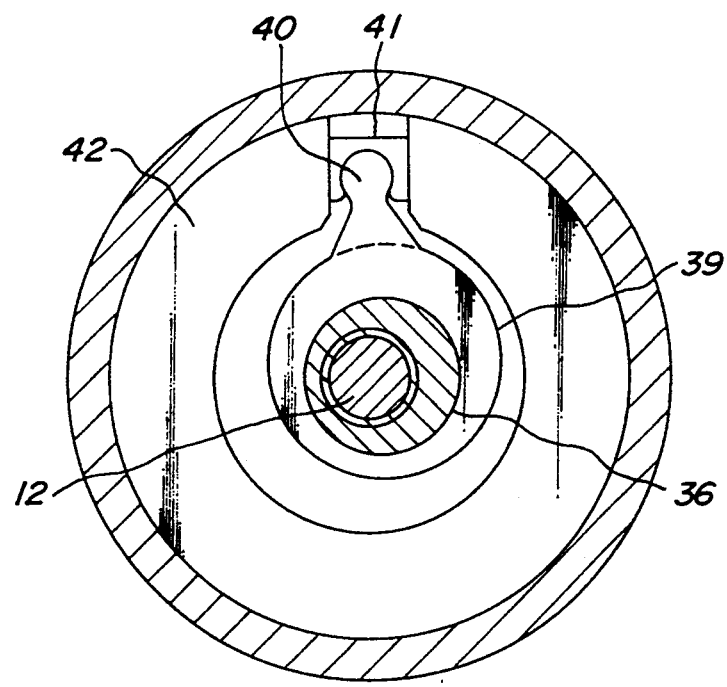

When the outer internal gear 43 is rotated, the disc portion 42 shown in FIGS. 12–14 is rotated in a direction shown by an arrow Y, so that the extension 40 is also rotated in the direction shown by the arrow Y with the groove 42a and the slider 41. As the extension 40 is formed integrally with the outer eccentric cam 39, the outer and inner eccentric cams 39 and 36 are rotated in unison.

In order to change the resultant eccentricity of the inner and outer eccentric cams 36 and 39, the eccentricity operating lever 50 is moved, for example, in a direction shown by an arrow Z as shown in FIG. 15, so that the sector gear 49 is rotated about the shaft 51 in a direction shown by an arrow $\alpha$ to cause the gear 48 in mesh therewith to rotate in the direction shown by the arrow V, with the result that the arm 47 integral with the gear 48 is rotated in a direction shown by an arrow $\beta$. If the crankshaft 12 is stationary, the inner internal gear 38 is also stationary, so that when the arm 47 is rotated in the direction $\beta$, the rocking gear 46 is revolved in the direction U about the crankshaft 12, while rotating about its axis in the direction $\beta$. As the result, the center gear 44 is rotated in the direction V, so that the fixed gear 45 is rotated in a direction shown by an arrow W and the outer internal gear 43 in mesh therewith is rotated in a direction shown by an arrow X. In this case, as described above, because the inner internal gear 38 is stationary, the outer internal gear 43 is rotated through a predetermined angle relative to the inner internal gear 38. In other words, the outer eccentric cam 39 is rotated relative to the inner eccentric cam 36.

FIGS. 4 and 5 illustrate the maximum resultant eccentricity between the cams 36 and 39. As the outer eccentric cam 39 is rotated from the position shown in FIGS. 2 and 3 relative to the inner eccentric cam 36, the resultant eccentricity decreases successively.

Assuming that the eccentricity of the inner eccentric cam 36 is $l_1$ and the eccentricity of the outer eccentric cam 39 relative to the inner eccentric cam 36 is $l_2$, the cams shown in FIG. 12 are set as $l_1 = l_2$. When the outer eccentric cam 39 is rotated through 180° from the position of the maximum resultant eccentricity relative to the inner eccentric cam 36, the resultant eccentricity becomes zero. FIG. 12 illustrates a condition that the resultant eccentricity is the maximum, FIG. 13 illustrates a condition that the inner eccentric cam 36 is rotated through 90° from the position shown in FIG. 12 relative to the outer eccentric cam 39, and FIG. 14 illustrates a condition that the inner eccentric cam 36 is rotated through 180° from the position shown in FIG. 12 relative to the outer eccentric cam 39, that is the resultant eccentricity is zero.

In other words, the resultant eccentricity of the inner and outer eccentric cams 36 and 39 can be set at will between the maximum value as shown in FIGS. 4 and 5 and zero.

Although the operation has been explained in the event that the crankshaft 12 is stationary, the operation can be effected in the same manner even if the crankshaft 12 is being rotated.

When the inner and outer eccentric cams 36 and 39 are rotated in unison by the rotation of the crankshaft 12, the respective plungers 52 are reciprocally moved in the cylinder bores 17a in direction shown by arrows a and b in FIG. 4 by the camming action with the aid of the cam followers 53 brought in contact with the outer eccentric cam 39 by the coil springs 54. When the plunger 52 is moved in the direction a, the oil enters the cylinder bore 17a from the suction side hydraulic oil passage 55 through the check valve 57. On the other hand, when the plunger 52 is moved in the direction b, the oil is discharge to the delivery side hydraulic oil passage 56 through the check valve 58. While the crankshaft 12 is rotated through 360°, each the plunger 52 completes one cycle, so that the hydraulic oil is delivered to the delivery side hydraulic oil passage 56 by each the plunger 52.

The discharged oil enters the pressure side recess 99 through the conduit 114 shown in FIGS. 1 and 2 and the pressure side passage 100 of the hydraulic motor 88 shown in FIGS. 18 and 19. Accordingly, the large gear 93 is rotated in a direction shown by an arrow c and the small gear 94 is rotated in a direction shown by an arrow d in FIG. 18. The rotation of the large gear 93 is transmitted through the one-way clutch (not shown) to the rear wheel hub 96 (FIG. 3), thereby driving the bicycle.

When the gears 93 and 94 are rotated as described above, the oil flows into the return passage 103 through the discharge side recess 102. The oil in the return passage 103 is then returned into the suction side oil passage 55 of the hydraulic pump O through the conduit 115.

During the above operation, all the hydraulic oil is returned to the oil passage on the suction side through the oil passage 59, the annular grooves 106 and 109 and passages 111 and 103 communicating therewith in the casing, so that there is no risk of the oil leaking out of the hydraulic system.

As described above, the oil reservoir 87 is provided in the seat tube 7 and communicated with the suction side hydraulic oil passage 55 of the hydraulic pump O. Therefore, even if a little amount of oil leaks out of the hydraulic system, this bicycle can be used for a long period without any replenishment of oil because of oil supply from the reservoir 87.

A ratio of rotation of the driving wheel to that of the crankshaft 12 is determined by a ratio of amount of oil discharged from the pump O to amount of oil discharged from the motor 88. The ratio of discharged oil amount should be determined so as to be suitable for each bicycle. For example, if the maximum delivery amount of the pump O is 116 cc per one rotation of the crankshaft 12 and the amount of discharged oil from the hydraulic motor 88 is 30 cc per one rotation of the gear 93, the driving wheel is rotated about 3.8 rotations per one rotation of the crankshaft with the maximum eccentricity of the eccentric cams.

Accordingly, the bicycle with the hydraulic transmission according to the invention is able to change infinitely the rotating ratio of the driving wheel with respect to the crankshaft 12 from the maximum to zero by changing the eccentricity of the cam assembly to change the delivery amount of the hydraulic pump O. In other words, the ratio of rotation of the crankshaft to that of the driving wheel can be infinitely changed for example from 1:38 to 1:0 theoretically.

The operation of the automatic speed change device P in this embodiment will be explained hereinafter. The eccentricity operating lever 50 can of course be manually operated. In the embodiment comprising the automatic speed change device P shown in FIGS. 15–17, such an operation is effected automatically by introducing the hydraulic pressure in the delivery side hydraulic oil passage 56 of the pump O into the pressure chamber e in the cylinder 70 through the hydraulic oil passage 62, lower down tube 6 and hydraulic oil passages 79 and 78 as shown in FIG. 6.

When the crankshaft 12 is rotated by pressing the pedals of the bicycle in order to drive it, the hydraulic pressure prevailed in the delivery side hydraulic oil passage 56 of the pump O increases or decreases depending upon rotating torque acting upon the crank arms 13. In other words, the higher the resistance to driving of the bicycle, the higher the hydraulic pressure acting in the pressure chamber e, and the lower the resistance, the lower the pressure in the pressure chamber e.

Accordingly, when the transmission is set in a standard speed change ratio (an intermediate speed change ratio), the piston 71 is at a mid position of its operating range as shown in FIG. 15 and the differential thrust of the pistons 71 and 77 caused by the hydraulic pressure in the pressure chamber e and the reaction force of the coil spring 80 are balanced. With this balanced condition, when the driving force increases from its standard value, the hydraulic pressure in the pressure chamber e becomes higher, so that the pistons 71 and 77 and the piston rods 72 and 76 are moved in a direction shown by an arrow f, with the result that the eccentricity of the cam assembly consisting of the eccentric cams 36 and 39 becomes smaller. Therefore, the delivery amount of the hydraulic pump O decreases to reduce automatically the rotating ratio of the rear wheel 10 driven by the hydraulic motor 88 to the crankshaft 12. In other words, when the pressing of the pedals 14 of the bicycle becomes more difficult or requires larger force, a lower rotating ratio between the rear wheel 10 and the crankshaft 12 is automatically accomplished.

On the other hand, when the driving force decreases from its standard value or the pressing of the pedals becomes easier, the pressure in the pressure chamber e in the cylinder 70 becomes lower, so that the pistons 71 and 77 and the piston rods 72 and 76 are moved in a direction shown by an arrow g in FIG. 15, with the result that the eccentricity of the cam assembly consisting of the eccentric cams 36 and 39 becomes larger and the delivery of the hydraulic pump O increases. Therefore, the rotating ratio of the rear wheel 10 driven by the hydraulic motor 88 to the crankshaft 12 automatically increases. In other words, when the pressing of the pedals becomes easier, a higher rotating ratio between the rear wheel and the crankshaft is automatically accomplished. According to the invention, therefore, the bicycle can be easily driven with infinitely and automatically variable speeds.

As mentioned above, according to the present invention, a planetary gear type speed up gear is provided to increase the rotation of the crankshaft 12, so that the number of rotations attained by a person's relatively low foot power can be increased as much as about three times in the embodiment. Accordingly, according to the present invention the delivery amount of the hydraulic pump O is extremely increased to several times as much as three times that of the conventional hydraulic pump.

Thus, capacity of the fixed displacement hydraulic motor mounted on the side of the driving wheel can be increased to about three times that of the conventional hydraulic motor. Accordingly, the hydraulic pressure to be used for attaining the same driving torque as that of the prior art can be greatly decreased to about one third of the prior art so that the transmitting efficiency can be increased and the apparatus can be easily designed and manufactured.

Furthermore, according to the present invention, the planetary gear type speed up gears M, the eccentric cam assembly N and the variable displacement hydraulic pump O are housed in the casing 15 enclosing the hanger portion of the bicycle so that the casing 15 is arranged in balance at the opposite sides of the hanger portion. Therefore, the bicycle according to the invention has improved balance in right and left sides so that the crank pedal can be smoothly operated.

The outer case 19 of the casing 15 is integrally provided at its periphery with protrusions 19a and 19b adapted for fitting ends of frame tubes 6 and 7 to connect the frame tubes 6 and 7 to the casing 15 so that the casing is utilized as the hanger portion of the conventional bicycle. Therefore, according to the present invention, it is not necessary to provide additionally means for connecting the casing 15 and the frame tubes, so that the frame tube can be simply constructed without decreasing its strength.

Still further, according to the present invention, the frame tube 6 is connected to the casing to communicate with the hydraulic oil passage 56 in the casing 15 and also connected to the automatic speed changing hydraulic cylinder 70 to communicate with the hydraulic oil chamber e in the hydraulic cylinder 70, so that it is not necessary to provide additional hydraulic passages and additional outer pipe lines. Therefore, it is easy to manufacture and a design effect is obtained.

Furthermore, the frame tube 7 connected to the casing 15 is communicated with the hydraulic oil passage 55 in the casing 15 and is provided at its upper portion with an air vent 86 to use the inner space of the frame tube 7 as an oil reserver 87, so that it is not necessary to provide additional hydraulic oil passages and an outside reserver.

Further, according to the present invention, the hydraulic cylinder is provided with large and small pistons 71 and 77 connected to each other to provide a hydraulic oil chamber between the pistons 71 and 77, so that the output of the hydraulic cylinder is determined by a differential area between the hydraulic pressure receiving areas of the large and small pistons 71 and 77. Therefore, the balancing spring 80 in the hydraulic cylinder can be made small by making the differential area smaller to miniaturize the apparatus.

What is claimed is:

1. A hydraulic drive system for bicycles, comprising:
   a casing adapted for enclosing a hanger portion of a bicycle;
   a rotatable crankshaft extending through said casing;
   planetary gear type speed up gears including a carrier which is integral with said crankshaft so as to rotate in unison with said crankshaft, a sun gear rotatably disposed on said crankshaft, and a plurality of planetary gears supported and driven by said carrier, said plurality of planetary gears engaging said sun gear to transmit an increased rotational speed to said sun gear with respect to said crankshaft;
   an eccentric cam assembly including an outer eccentric cam and an inner eccentric cam driven by said sun gear of said speed up gears; and
   a variable displacement hydraulic pump having plungers driven by the outer eccentric cam of the cam assembly and provided at an input portion of the drive system, said speed up gears, said eccentric cam assembly and said variable displacement hydraulic pump being housed in said casing.

2. The system according to claim 1, wherein said casing has peripheral protrusions adapted for fitting respective frame tubes of the bicycle, the frame tubes being connected to the casing through the protrusions.

3. The system according to claim 2, further comprising:
   hydraulic oil passages extending through the frame tubes and being connected to the casing;
   conjugate hydraulic oil passages in the casing, said hydraulic oil passages being connected to said conjugate hydraulic oil passages; and
   an automatic speed changing hydraulic cylinder having an oil chamber which is connected to the hydraulic oil passages of the frame tubes.

4. The system according to claim 3, wherein an internal space of one frame tube is connected to the casing, and one of said conjugate hydraulic oil passages is a suction side hydraulic passage, said internal space being communicated with said suction side hydraulic passage in the casing, and an upper portion of the internal space in said one frame tube is provided with an air vent to provide an oil reservoir in said one frame tube.

5. The system according to claim 4, wherein said hydraulic cylinder comprises: a cylinder having a head pivotally connected to a frame member, a large piston, a small piston having a diameter smaller than that of the large piston, said large and small pistons being connected together by a piston rod to define a hydraulic oil cavity therebetween, and another of said conjugate hydraulic oil passages is a delivery side hydraulic oil passage, said hydraulic oil cavity being communicated with said delivery side hydraulic oil passage in the casing, and a spring for returning the large and small pistons moved by differential pressure applied thereto to an initial position.

6. The system according to claim 1, wherein said inner eccentric cam is eccentrically disposed on said crankshaft and the outer eccentric cam is snugly rotatably and eccentrically fitted on the inner eccentric cam, said system further comprising eccentricity control means for changing the eccentricity of the eccentric cam assembly, said eccentricity control means comprising an inner internal gear integral with said inner eccentric cam and having a center coincident with said crankshaft, an outer internal gear rotatable together with said outer eccentric cam, said inner and outer internal gears having an equal number of teeth and an equal pitch diameter, said outer internal gear being located next to, concentric with, and rotatable relative to said inner internal gear, a center gear rotatable on said crankshaft, a fixed gear rotatable on a fixed member and in mesh with said center gear and one of said inner and outer internal gears, and a rocking gear rotatable on a free end of a rocking arm and in mesh with said center gear and the other of said inner and outer internal gears, thereby adjusting the eccentricity of said eccentric cam assembly in a stepless manner by rocking said rocking arm.

* * * * *